(12) United States Patent
McGuire et al.

(10) Patent No.: US 8,593,102 B2
(45) Date of Patent: Nov. 26, 2013

(54) PORTABLE, SELF-SUSTAINING POWER STATION

(75) Inventors: Dennis McGuire, Stuart, FL (US); Sanjeev Jakhete, Stuart, FL (US)

(73) Assignee: Ecosphere Technologies, Inc., Stuart, FL (US)

( * ) Notice: Subject to any disclaimer, the term of this patent is extended or adjusted under 35 U.S.C. 154(b) by 0 days.

(21) Appl. No.: 13/037,010

(22) Filed: Feb. 28, 2011

(65) Prior Publication Data

US 2011/0146751 A1    Jun. 23, 2011

Related U.S. Application Data

(63) Continuation-in-part of application No. 11/965,422, filed on Dec. 27, 2007.

(60) Provisional application No. 60/882,054, filed on Dec. 27, 2006.

(51) Int. Cl.
*H01M 10/44* (2006.01)

(52) U.S. Cl.
USPC ......... 320/101; 361/601; 60/641.15; 136/245

(58) Field of Classification Search
USPC ................. 52/655.1; 136/246, 245; 60/641.8–641.15; 320/101, 109; 361/601
See application file for complete search history.

(56) References Cited

U.S. PATENT DOCUMENTS

| | | | |
|---|---|---|---|
| 360,934 A * | 4/1887 | Waite | 607/65 |
| 4,256,088 A * | 3/1981 | Vindum | 126/571 |
| 4,261,329 A * | 4/1981 | Walsh et al. | 126/569 |
| 4,359,951 A * | 11/1982 | Dauvergne | 110/234 |
| 4,421,943 A * | 12/1983 | Withjack | 136/246 |
| 4,429,178 A * | 1/1984 | Prideaux et al. | 136/246 |
| 4,452,234 A * | 6/1984 | Withjack | 126/627 |
| 4,601,282 A * | 7/1986 | Mountain | 126/574 |

(Continued)

FOREIGN PATENT DOCUMENTS

| | | |
|---|---|---|
| DE | 3405466 | 8/1985 |
| DE | 29700461 | 6/1997 |

(Continued)

OTHER PUBLICATIONS

SkyBuilt Power, "Mobile Power Station TM MPS", http://skybuilt.com/schematic.htm.

*Primary Examiner* — William Gilbert
*Assistant Examiner* — James Ference
(74) *Attorney, Agent, or Firm* — McHale & Slavin, P.A.

(57) ABSTRACT

A self-sustaining, portable, power station that may be moved by land, air, or sea to an area that has no utilities. The station is provided with solar panel arrays in communication with at least one electrical distribution and storage means. The derived electricity is used to power various systems including, albeit not limited to, a communications system, a water filtration system, a water distribution system to allow the public to draw potable water and provide basic hygiene. The electricity derived may also be used to run outside systems, such as schools, hospitals, or the like. The solar panel arrays are mounted on roller assemblies that can be easily slide between a stowed and deployed condition. The solar arrays include a plurality of solar panels that are supported by one or more hydraulic actuators to counter balance the weight of the solar panel whereby the solar panel can be easily positioned into the desired tilted orientation.

11 Claims, 18 Drawing Sheets

(56) References Cited

U.S. PATENT DOCUMENTS

| | | | |
|---|---|---|---|
| 4,628,692 A * | 12/1986 | Pierce | 60/641.8 |
| 4,633,767 A * | 1/1987 | Sain | 454/92 |
| 4,995,377 A * | 2/1991 | Eiden | 126/605 |
| 5,111,127 A * | 5/1992 | Johnson | 320/101 |
| 5,184,502 A * | 2/1993 | Adams et al. | 73/31.01 |
| 5,315,794 A * | 5/1994 | Pearson | 52/79.1 |
| 5,338,369 A * | 8/1994 | Rawlings | 136/246 |
| 5,350,138 A * | 9/1994 | Culbertson et al. | 244/159.6 |
| 5,379,596 A * | 1/1995 | Grayson | 62/3.62 |
| 5,520,747 A * | 5/1996 | Marks | 136/245 |
| 5,875,431 A | 2/1999 | Heckman et al. | |
| 5,935,431 A * | 8/1999 | Korin | 210/205 |
| 5,969,501 A * | 10/1999 | Glidden et al. | 320/101 |
| 6,016,634 A * | 1/2000 | Sayer | 52/648.1 |
| 6,041,242 A * | 3/2000 | Coulthard | 455/575.1 |
| 6,058,930 A * | 5/2000 | Shingleton | 126/600 |
| 6,101,750 A * | 8/2000 | Blesener et al. | 40/448 |
| 6,123,067 A * | 9/2000 | Warrick | 126/593 |
| 6,128,903 A * | 10/2000 | Riege | 60/641.8 |
| 6,201,181 B1 * | 3/2001 | Azzam et al. | 136/244 |
| 6,380,481 B1 * | 4/2002 | Muller | 136/244 |
| 6,396,239 B1 * | 5/2002 | Benn et al. | 320/101 |
| 6,552,257 B1 * | 4/2003 | Hart et al. | 136/246 |
| 6,559,371 B2 * | 5/2003 | Shingleton et al. | 136/246 |
| 6,559,552 B1 * | 5/2003 | Ha | 290/54 |
| 6,563,040 B2 * | 5/2003 | Hayden et al. | 136/244 |
| 6,672,018 B2 * | 1/2004 | Shingleton | 52/173.3 |
| 6,810,382 B1 | 10/2004 | Wamsley et al. | |
| 6,930,237 B2 * | 8/2005 | Mattiuzzo | 136/251 |
| 7,150,153 B2 * | 12/2006 | Browe | 60/641.1 |
| 7,230,819 B2 * | 6/2007 | Muchow et al. | 361/601 |
| 7,444,816 B2 * | 11/2008 | Hon | 60/641.8 |
| 7,469,541 B1 * | 12/2008 | Melton et al. | 60/641.1 |
| 7,492,120 B2 * | 2/2009 | Benn et al. | 320/101 |
| 7,511,451 B2 * | 3/2009 | Pierce | 320/103 |
| 7,531,741 B1 * | 5/2009 | Melton et al. | 136/246 |
| 7,565,968 B2 * | 7/2009 | Lindley | 206/223 |
| 2001/0037204 A1 | 11/2001 | Horn et al. | |
| 2002/0121781 A1 * | 9/2002 | Douglas | 290/55 |
| 2003/0009954 A1 * | 1/2003 | Bradley | 52/79.1 |
| 2003/0070430 A1 * | 4/2003 | Beckius et al. | 60/645 |
| 2003/0132688 A1 * | 7/2003 | Domenig | 312/334.27 |
| 2003/0167105 A1 * | 9/2003 | Colborn | 700/295 |
| 2003/0213185 A1 * | 11/2003 | Findley | 52/67 |
| 2004/0124711 A1 * | 7/2004 | Muchow et al. | 307/64 |
| 2004/0239287 A1 * | 12/2004 | Batts-Gowins | 320/103 |
| 2005/0055891 A1 * | 3/2005 | Kuebler | 52/79.1 |
| 2005/0139530 A1 * | 6/2005 | Heiss | 210/85 |
| 2006/0065606 A1 * | 3/2006 | McGuire | 210/749 |
| 2006/0113251 A1 * | 6/2006 | McGuire et al. | 210/652 |
| 2006/0137348 A1 * | 6/2006 | Pas | 60/641.1 |
| 2006/0260672 A1 | 11/2006 | Niederer | |
| 2007/0084205 A1 * | 4/2007 | Teets et al. | 60/597 |
| 2007/0151929 A1 * | 7/2007 | Wright et al. | 210/663 |
| 2007/0210236 A1 * | 9/2007 | Yungner et al. | 248/678 |
| 2008/0264363 A1 * | 10/2008 | Heusser et al. | 123/90.12 |

FOREIGN PATENT DOCUMENTS

| | | |
|---|---|---|
| DE | 19646612 | 3/1998 |
| DE | 9321520 | 9/1999 |
| DE | 10000874 | 7/2001 |
| EP | 0237445 | 9/1987 |
| EP | 0240962 | 10/1987 |
| ES | 2119687 | 10/1998 |
| FR | 2614368 | 10/1988 |
| GB | 2159219 | 11/1985 |
| JP | 08028495 | 1/1996 |
| WO | WO9420802 | 9/1994 |
| WO | WO03008803 | 1/2003 |
| WO | WO03031341 | 4/2003 |

* cited by examiner

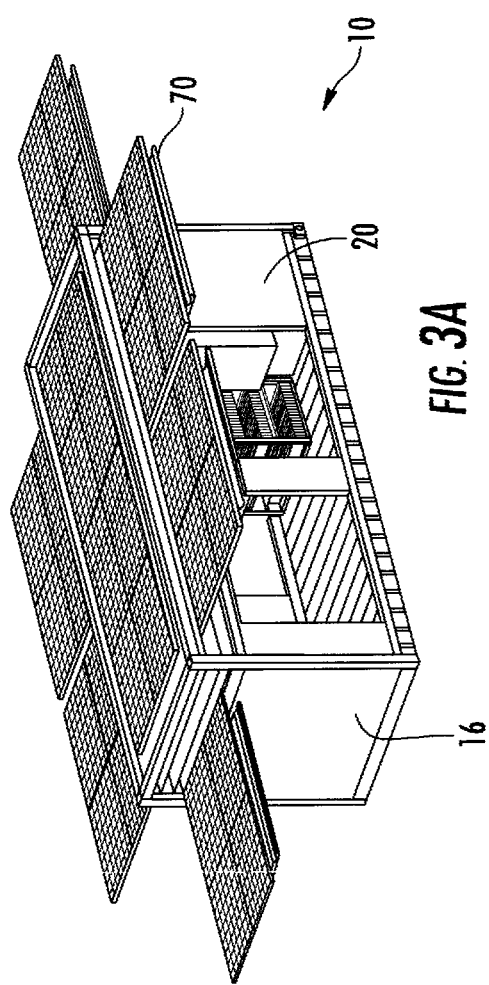

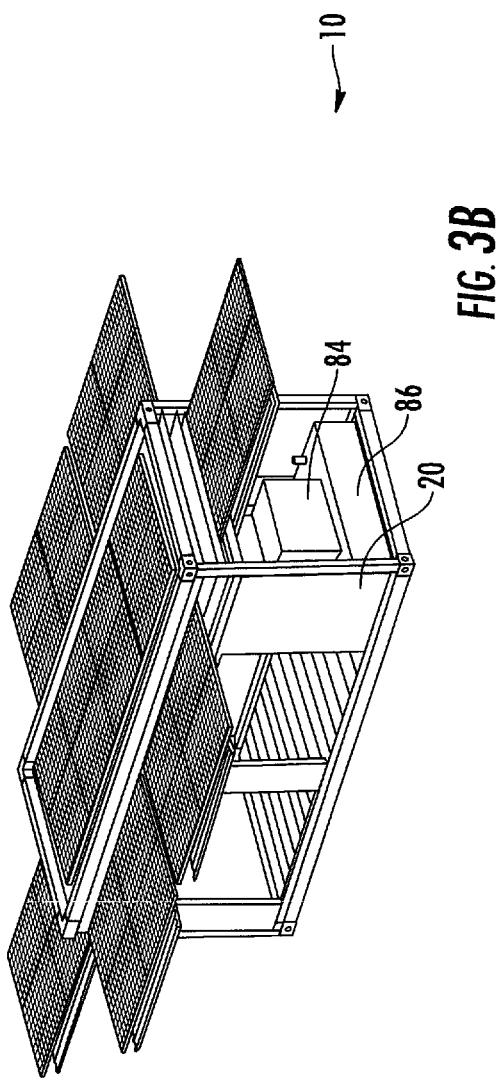

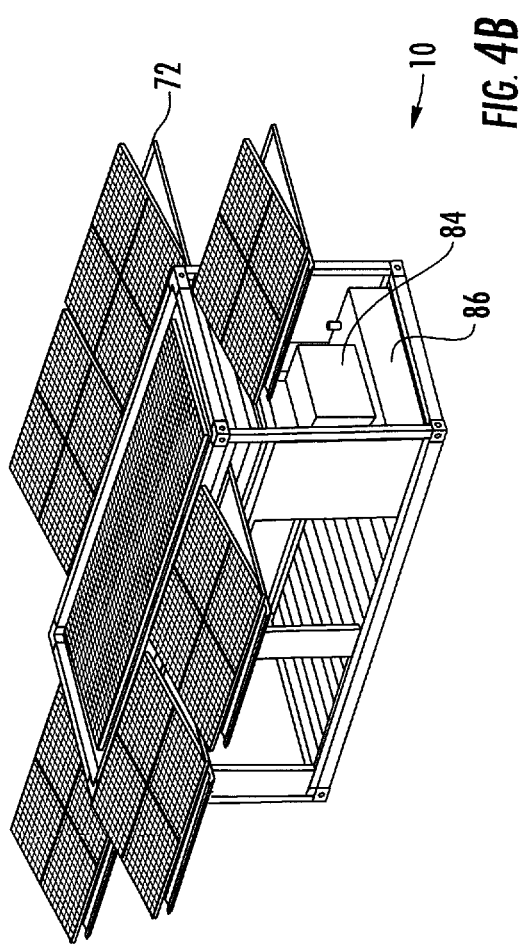

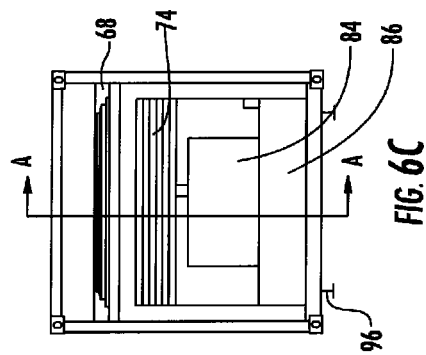
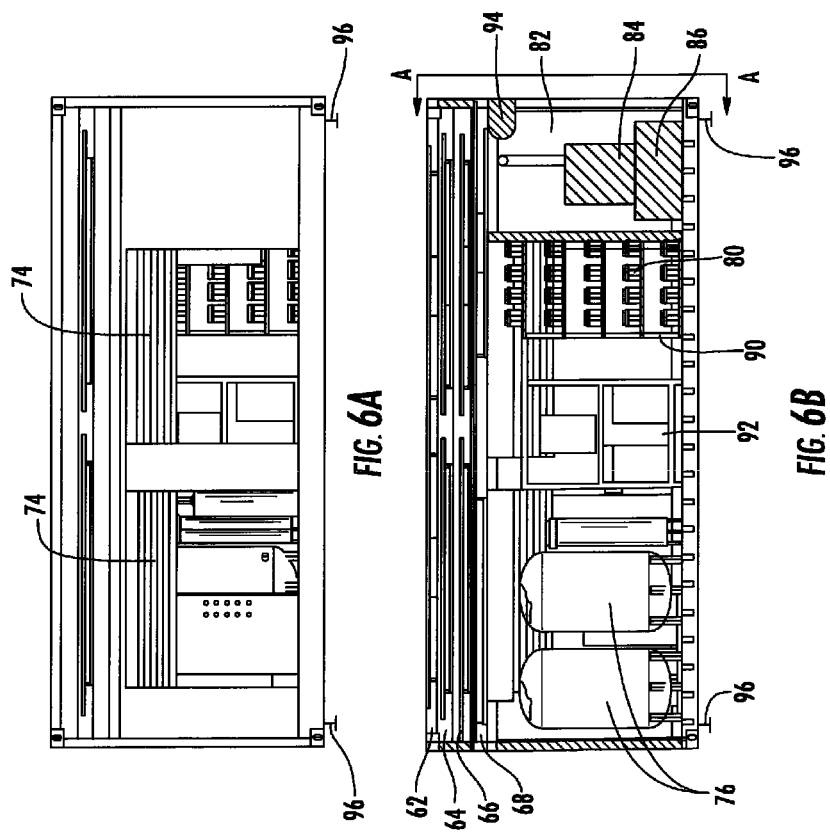

PORTABLE, SELF-SUSTAINING POWER STATION

CROSS REFERENCE TO RELATED APPLICATIONS

This application is a continuation-in-part of U.S. patent application Ser. No. 11/965,422, entitled "Portable Self-Sustaining Power Station", filed on Dec. 27, 2007, which claims benefit of the filing date of U.S. Provisional Patent Application No. 60/882,054, filed Dec. 27, 2006, the entire contents of these applications are expressly incorporated herein.

FIELD OF THE INVENTION

This invention relates to a portable and self-sustaining power station; particularly, to a power station for producing and distributing electrical power, potable water, and other services to areas that have no operating utilities.

BACKGROUND OF THE INVENTION

In the aftermath of the disastrous events of Sep. 11, 2001 and hurricane Katrina, the emergency response capability of most governmental agencies charged with such a mission has undergone a thorough review. After reviewing the tools and programs available to emergency response agencies (police, fire and rescue departments, hospitals, etc.) of local, state, and the federal government, certain inadequacies were uncovered. It became readily apparent that certain deficiencies persisted in treating large-scale disasters, including the lack of specifically designed equipment capable of being immediately deployed into disaster areas to supply basic needs for the inhabitants, such as water, electricity, telecommunications, etc. Such inadequacies include the inability of the survivors to reach relief supplies, the inability of the relief supplies to reach the survivors, and the lack of facilities to help the survivors and/or workers rebuild the infrastructure. Similar problems locating potable water and electricity are encountered daily by the inhabitants of developing and third world countries and/or those countries currently at war.

The use of large scale equipment, such as that employed by the U.S. government following Hurricane Katrina, produced potable water. However, survivors could not reach the location where the equipment was placed. Such equipment must be placed throughout the community so that the individuals residing in the community can reach such equipment on foot, and carry water from the equipment by hand.

There exist a multitude of mobile and portable power stations that supply electricity to field hospitals, emergency aid units, and water filtration systems. Most of these stations rely solely on generators which use fossil fuels (e.g., diesel oil) for generating electricity. However, these fossil fuels must be constantly replenished and their combustion releases harmful pollutants into the environment. Some of these portable stations also include tanks containing potable water or they are adapted to hook up to a supply of potable water. Since these limited resources often run out before the emergency situation has abated, portable and self-reliant stations have been designed which depend on wind turbines and/or solar cell panels for generating and storing electrical energy.

For example, U.S. Pre-grant publication No. 2006/01373348, to Pas, discloses a mobile power station provided with a wind turbine and/or solar cell panel containing solar cells and storage elements for storing electrical energy. The storage elements include a battery as well as a hydrogen system having a hydrogen generator, tank, and cell for generating electricity by combustion of hydrogen.

Similarly, the "Mobile Power Station"™ MPS is a self-sufficient power station housed in a standard shipping container. It includes at least one wind turbine and solar panels for self-generated power. Like the present invention, the MPS can be transported by truck, train, ship, plane or parachuted by plane. However, unlike the present invention, the MPS requires the use of the telescoping arms and solar panels which must be carefully assembled on the side of the container by a crew. The asymmetrical arrangement of the top panels on the top of the container can act as a sail that may tip the container during windy conditions.

None of the aforementioned prior art disclose the space saving arrangement of solar panels in the stowed position on top of the container of the inventive station. Nor does the prior art teach or suggest symmetrically arranging the solar panels in the deployed position to enhance the stability of the station. The symmetrical arrangement of the solar panels provides lateral stability to the station, without the need for an auxiliary support system used in Pas station, as described above. The solar panels of the present invention are constructed and arranged in a manner that maximizes the surface area exposed to the sun. Furthermore, the solar panels are arranged such that they may be easily and readily stowed inside or on top of the container when not in use or during transport of the station.

What is lacking in the art is a portable and self-sustaining power station that can be positioned within the disaster zone or a remote location and provides an electrical power system, a water treatment system capable of converting contaminated water into potable water, a water distribution system, and a telecommunications system.

SUMMARY OF THE INVENTION

Disclosed is a self-contained power station that may be moved by land, air, or sea to an area that has no operating utilities. The power station is provided with at least one wind turbine, at least one solar cell panel in communication with at an electrical distribution means and/or least one storage means capable of storing the energy generated by the wind turbine and the solar cell panels. The station employs at least one engine capable of operating a complete communications suite and water treatment equipment capable of making potable water from most sources of water, such as polluted reservoirs, lakes, streams, and fire hydrants and at least one generator. The station also includes a water distribution system to allow the public to draw potable water. The power station generates sufficient power to operate pumps to draw in and out the water but is efficiently sized to provide extended operation on minimal fuel.

Accordingly, it is a primary objective of the instant invention to provide a power station which supplies work space, living space, battery storage, at least one water treatment system, electricity, and telecommunications system. The entire station may be transported by rail, land vehicle, air lift, and water.

Another objective of the present invention is to provide a power station that includes a solar panel array that is mounted on a roller assembly that can be quickly and easily deployed by a single person.

Still another objective of the present invention is to provide a power station in the form of a freight or marine container. This type of container is designed to float if dropped in water making it particularly useful if the water level on land rises, as often happens during a hurricane or flood.

It is another objective of this invention to provide a modular raw water treatment system for producing potable water that uses multiple treatment processes to neutralize or remove contaminants in the raw water available at the site and generated during site cleanup or decontamination activities providing area inhabitants with drinking water and showering facilities. This system is the subject of U.S. patent application Ser. Nos. 11/075,844 and 11/264,659 both to McGuire, and are herein incorporated by reference in their entirety.

It is yet another objective of the instant invention to provide the station with environmental controls including air filtering, heating and cooling.

Still another objective of the present invention is to teach solar panels which are symmetrically arranged solar panels when in the deployed position to provide enhanced stability to the station, especially during windy conditions.

It is still another objective of the invention to teach the use of power stations that are sized to provide community support for areas that have little or no access to transportation by providing necessities that can be reached by foot.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 3A is an upper perspective view of the portable power station according to another embodiment of the invention, with the solar panels shown in the deployed position;

FIG. 3B is another upper perspective view of the portable power station according to the embodiment of FIG. 3A;

FIG. 4B is another upper perspective view of the portable power station according to the embodiment of FIG. 4A;

FIG. 6A is a side view of the power station along the longitudinal length of the station;

FIG. 6B is a side view of the power station opposite that seen in FIG. 6A;

FIG. 6C is another side view as seen along the A-A axis of FIG. 6B;

DETAILED DESCRIPTION OF THE INVENTION

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
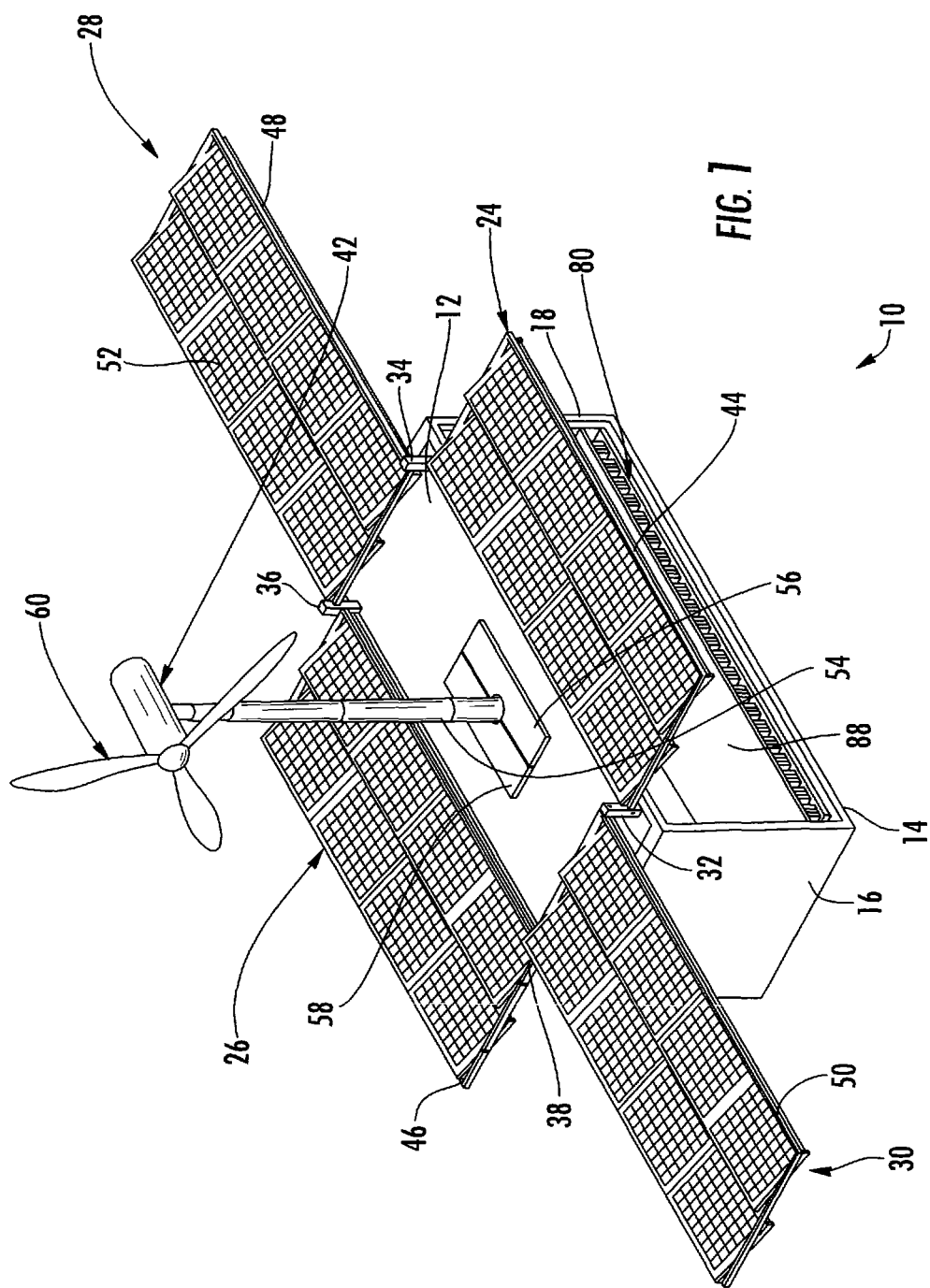
FIG. 1 is an upper perspective view of the portable power station according to one embodiment of the invention, with the solar panels and wind turbine in the deployed position.

Referring now to FIGS. 1-9, wherein like elements are numbered consistently throughout, FIG. 1 illustrates one embodiment of the inventive power station, generally referenced as 10. The station is in the form of a container with a top panel 12, bottom panel 14, two pairs of oppositely disposed sidewall panels (16, 18) (20, 22) forming an interior chamber 40. Although depicted here as a rectangular station, is it within the purview of the invention to provide a station in any shape, such as, square. The container is of sufficient strength and rigidity to support the weight of the building and its contents without significant deformation.

According to a preferred embodiment, the container is a previously used standard ISO container (also called a marine shipping container). Thus, the ISO container is recycled after use making it cost effective and good for the environment. Shipping containers are generally designed to float, should it fall off the boat en route to their destination, making it particularly suitable for use during a hurricane, or flood. Any size container may be utilized, for example, the building structure may be a 20 ft., standard ISO container with inside measurements of 20 ft. long, 8 ft. wide, and 8.5 ft. high. Other container sizes are contemplated herein, e.g., 30 ft., 40 ft.

The container is modified such that it has solar panel arrays (24, 26, 28, 30) pivotally attached along the upper perimeter of the top of the container and at least one wind turbine 42 extending through the top panel (as discussed further below). These solar panels are used to capture energy from the sun for immediate use or storage via any suitable electric storage means (e.g., battery), as is well known in the art. Each solar panel array is pivotal between a deployed position, as shown in FIG. 1, and a stowed position. For example, as shown in FIG. 1, the top of the container has rigidly attached and upwardly extending posts (32, 34, 36, 40) located proximate to the four corners of the top panel.

Each of the solar panels includes a rigid frame (44, 46, 48, 50) attached at one end to posts located on each corner of the container by any pivotal means of attachment known in the art (e.g., hinge, pin, etc.) For example, the first panel array 24 is the attached to the posts 32, 34 at a height closest to the top panel of the container. The second solar panel array 26 is pivotally attached to posts 36, 38 further up from the first. Likewise, the third solar panel array 28 is located higher along the posts 34, 36 than the second. The last panel array 30 located is the highest point along the posts 32, 38. In this manner, the panels are able to fold one on top of the other on the upper surface of the top panel of the container. This provides for easy and safe storage for the panels during transport of the station.

Each panel array includes individual solar cells on one side (underside). The panel arrays are rotated around their pivot means to the deployed position, as seen in FIG. 1, thereby exposing the solar cells disposed underneath to radiant energy from sun. The deployment and stowing of these panels is easily accomplished by a single person since it does not require assembly of solar panel supports or arms like that seen in the prior art. However, retractable support legs 112 may be used like those seen in see FIG. 9.

It is important to note that the deployed solar panels are symmetrically arranged along the upper perimeter of the container in order to uniformly balance the station and provide enhanced lateral stability thereto. This uniformity of weight helps to prevent the station from tipping over, especially when strong winds are acting against the wind turbine, discussed further below.

As discussed above, each of the solar panels arrays are housed in substantially rectangular, planar, and rigid frames. The rigid frames have a width and length dimension that is less than or equal to that of top panel for compact and easy storage. The solar panels include at least one linear array of panels pivotally attached at about the midpoint of both ends to the frame by any suitable pivot means (e.g., hinge, pin) from 0 to about 45 degree tilt capacity. Thus, once the solar panels arrays are deployed, this unique arrangement allows the user to easily pivot each linear array 52 from a substantially flat position (along the plane of the frame) to an angle that provides optimum interception of incident solar radiation on either side of the station without the need for support braces, extender arms, or the like, which are used to fix the solar panels to the desired angle, like that seen in the prior art. Each linear array is composed of a plurality of individual solar cells, preferably high efficiency like those manufactured by (SANYO INC.).

The wind turbine 60 reversibly expands from a stowed position to a deployed position (FIG. 1) via a rigid telescoping mast 54. When fully stowed, the wind turbine and mast are housed inside the interior of the container. When deployed, the mast extends through an aperture formed at a generally centralized location in the top panel of the station for stability, see for example FIG. 9. The mast and wind turbine are constructed and arranged to withstand at least 100 MPH winds. The aperture may be at least partly closed by two plates (56, 58) each having a cutout portion for laterally stabilizing the mast. The base of the mast is secured to the floor of the container. The telescoping mast allows the turbine to be positioned to any desired height above the station. The wind turbine 60 also includes detachable blades for easy storage when the unit is being transported inside the interior chamber of the container. Like the solar panels above, the turbine harnesses energy from the wind for use immediately or deposit in electrical storage means (battery), as is known in the art and need not be explained in detail. The energy stored in the batteries 80 can then be utilized when there is little sunlight or wind. In addition, the station is provided with at least one generator/engine 84 and associated fuel tank 86 for storing fuel (e.g., diesel) for peaking or supplemental power when the solar panels, wind turbines and electrical storage means are not sufficient.

According to another embodiment, illustrated in FIGS. 3a-9, the container may be designed with a different solar panel deployment system capable of withstanding high wind conditions, like those encountered after a hurricane. Similar to the previous embodiment described above, the solar panels are symmetrically arranged along the upper perimeter of the container in the deployed position, which helps prevent the station from tipping over. The container is designed with separate compartments (62, 64, 66, 68) each for housing a solar panel array (best seen in FIGS. 6A-C). FIGS. 3A-B illustrate the solar panels in the deployed position. FIGS. 4A-B illustrate the solar panels in the deployed and angled position. Any suitable tilting mechanism capable of arranging the solar panel arrays to the desired angle may be used.

Figure 5:
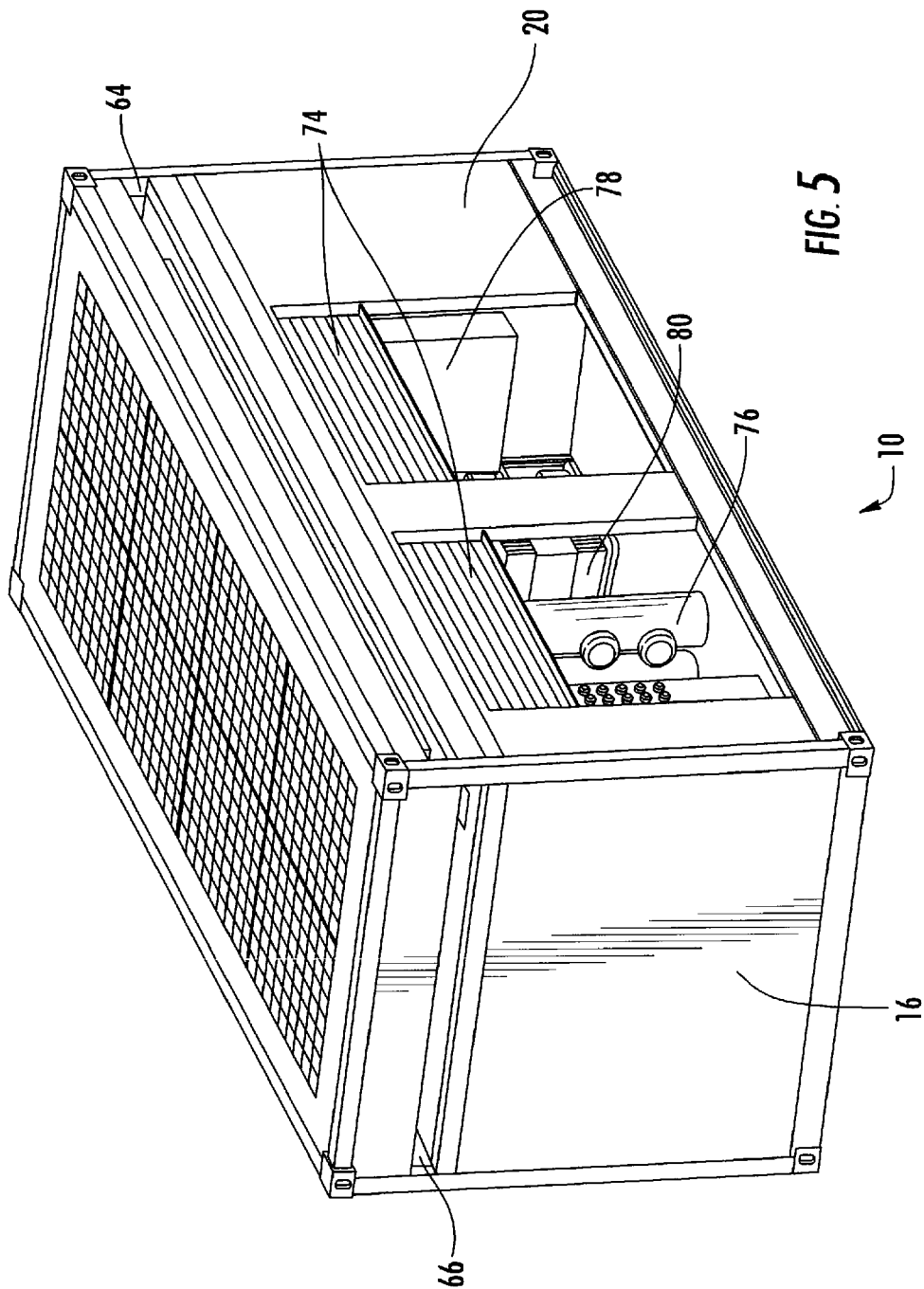
FIG. 5 is an upper perspective view of the portable power station with the solar panel arrays in the stowed position.
Figure 7A:
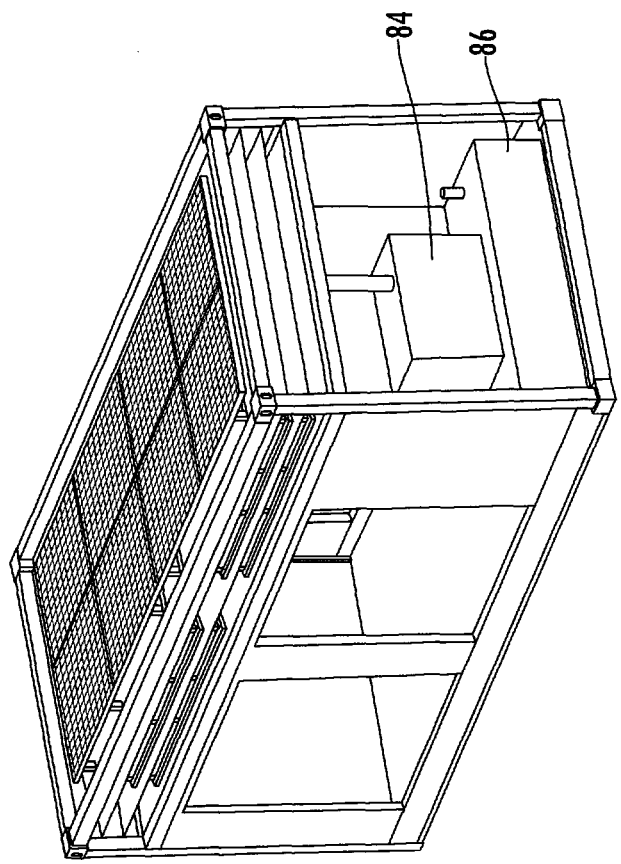
FIG. 7A is upper perspective view of the portable power station with the panels stowed in their respective compartments.
Figure 7B:
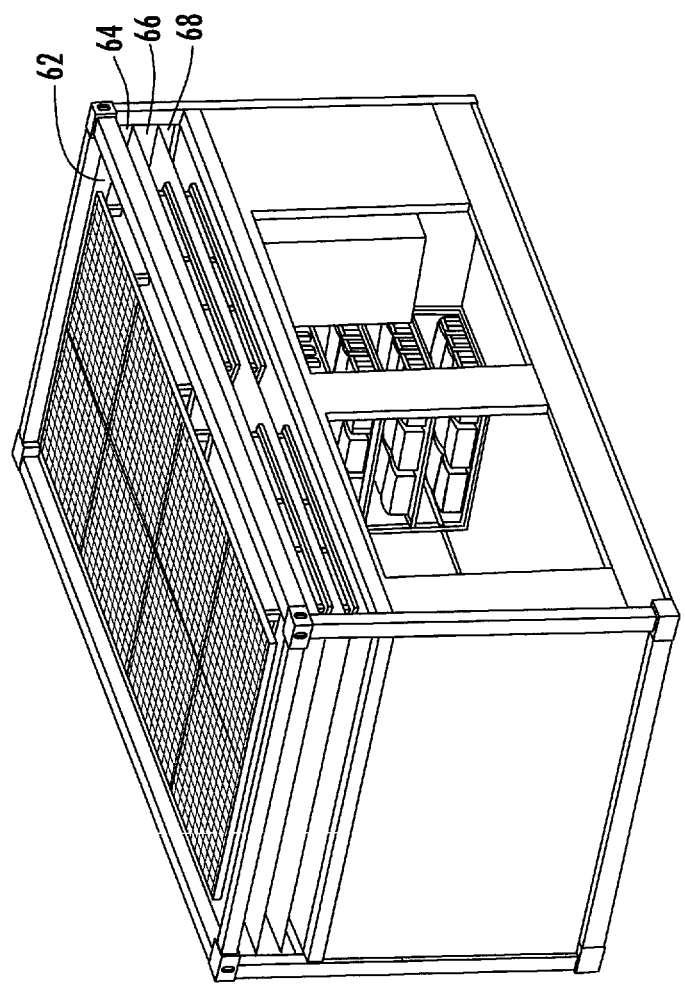
FIG. 7B is another upper perspective view of the portable power station of the size opposite FIG. 7A with the panels in the stowed position.

Similar to the previous embodiment, the solar panels arrays are housed in a rectangular, planar, and rigid frame 72 having a width and length dimension that is less than or equal to that of top panel for compact and easy storage within the compartments, see FIG. 5. Each of these solar panel arrays is attached to a panel slide mechanism. Only the solar panel array in the uppermost compartment does not include any slide mechanism and remains stationary and does not tilt during use. One example of suitable sliding mechanism may include a pair of rollers installed in the compartment at a dimension corresponding width or length of the solar panel array. The arrays easily slide within the track attached to the sides of the panel arrays, in a manner similar to that used in a desk drawer. Obviously, this arrangement of rollers and tracks could be reversed without departing from the scope of the invention.

Referring now to FIGS. 6A-B which illustrate a cross-sectional view of the power station according to this embodiment, the upper portion of the container has four compartments at different levels or heights relative to the top surface of the container, with solar panels housed inside for protection during transport. These compartments also include locking means (not shown) to prevent the solar panel arrays from sliding out unintentionally during transport.

Figure 2:
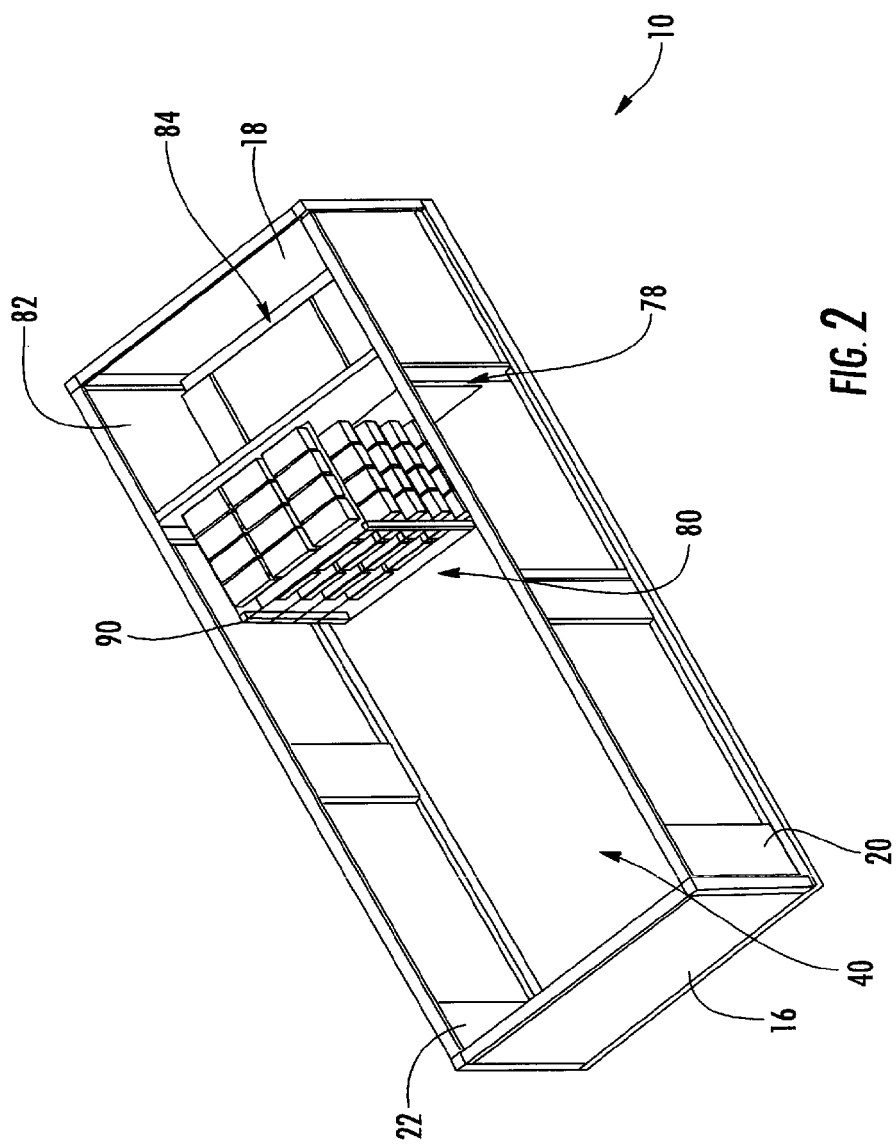
FIG. 2 is an upper perspective view of the portable power station with the top panel removed so that the interior chamber is revealed.
Figure 4A:
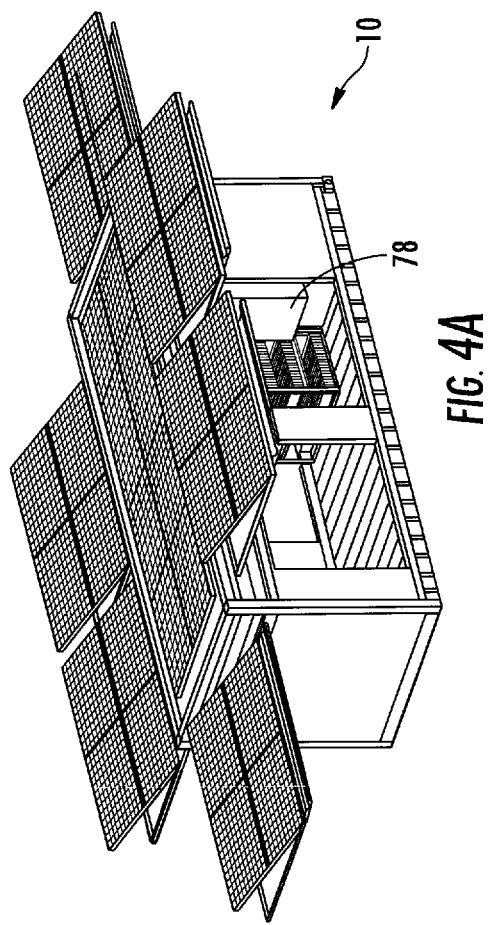
FIG. 4A is an upper perspective view of the portable power station, with the solar panels shown in the deployed and tilted position.

Any of the aforementioned embodiments of the power station may include windows (not shown) or access doors 74 for ingress and egress and for viewing the surrounding area. The container interior may also be divided up into different areas for housing the water filtration system 76, control panels (e.g., main power distribution panel) 78, battery packs 80, main electrical panel, etc. (see FIGS. 5-7B). As shown in FIG. 2, the station may also include at least one small compartment 82 which is insulated for sound and designed to include a generator 84 and/or fuel tank (e.g. may include vent 94 with air filter system to expel generator fumes). One or all of the windows may be sealed or openable and the access doors may be roll-up type, as shown in FIG. 5. The container may be mounted on wheels (not shown), as a towed vehicle or it may be self powered with a driving station (not shown). The station may be moved on a trailer or airlifted in the hold of an aircraft or suspended by sling. The wheels may be removed to facilitate shipping and installation on a site. Rollers may be included on the bottom of the building to facilitate loading of the structure into the transporter. In addition, the bottom surface of the building structure may be sealed to allow movement by water, such as on the deck of a boat or towed by small boat with pontoons temporarily or permanently affixed to the bottom (not shown).

In order to conserve on space, the floor of the station may be raised to create an area designed for housing the storage batteries (see FIG. 1). The raised floor 88 makes it easy for mounting of power system controls and auxiliary equipment modules. Otherwise, the batteries may be housed on rack 90 inside the container (see FIG. 2). The batteries 80 are secured to the racks by straps or the like.

Figure 8:
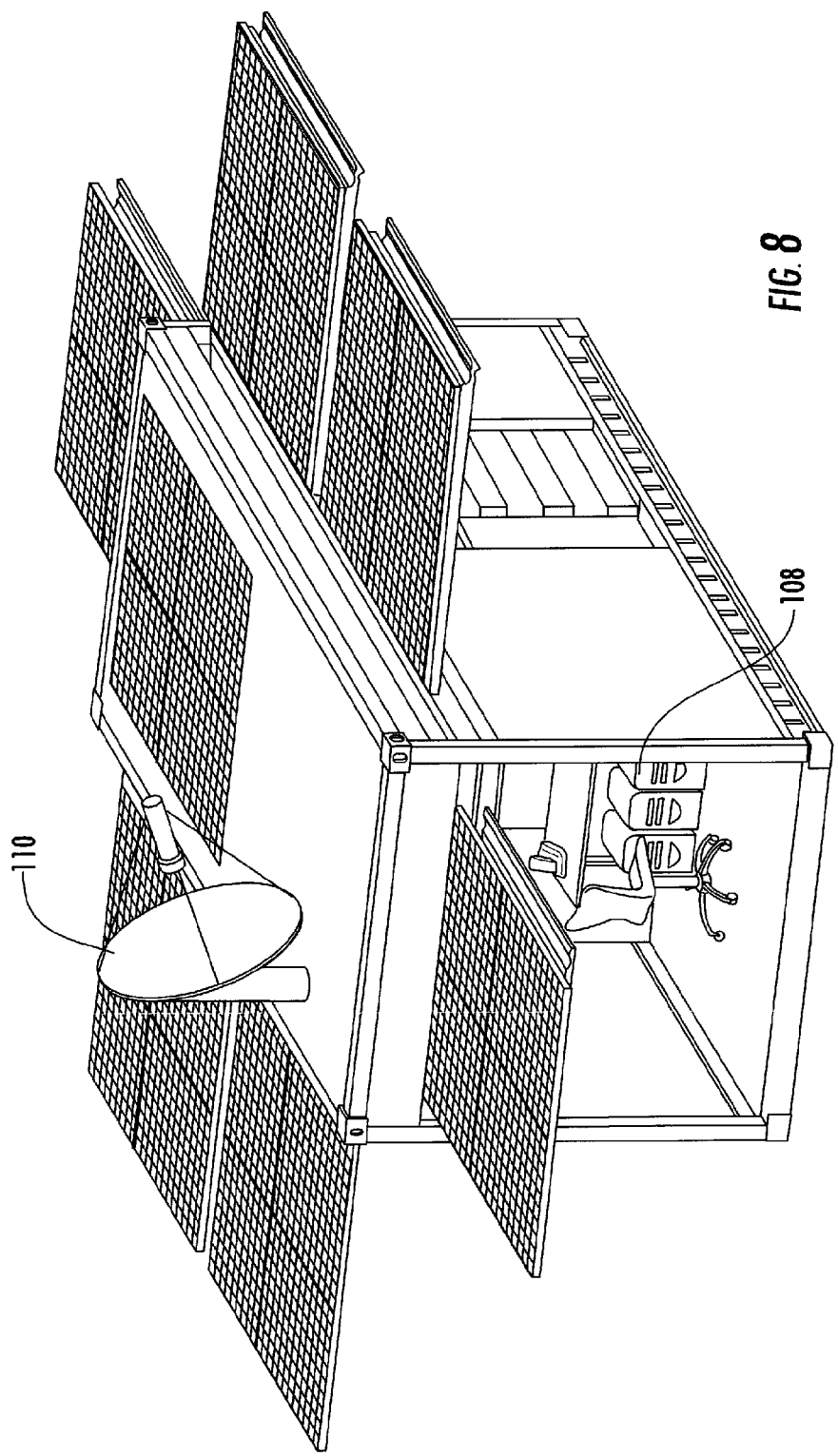
FIG. 8 is an upper perspective view of the portable power station according to another embodiment of the invention including a communication satellite dish attached to the top of the container.
Figure 9:
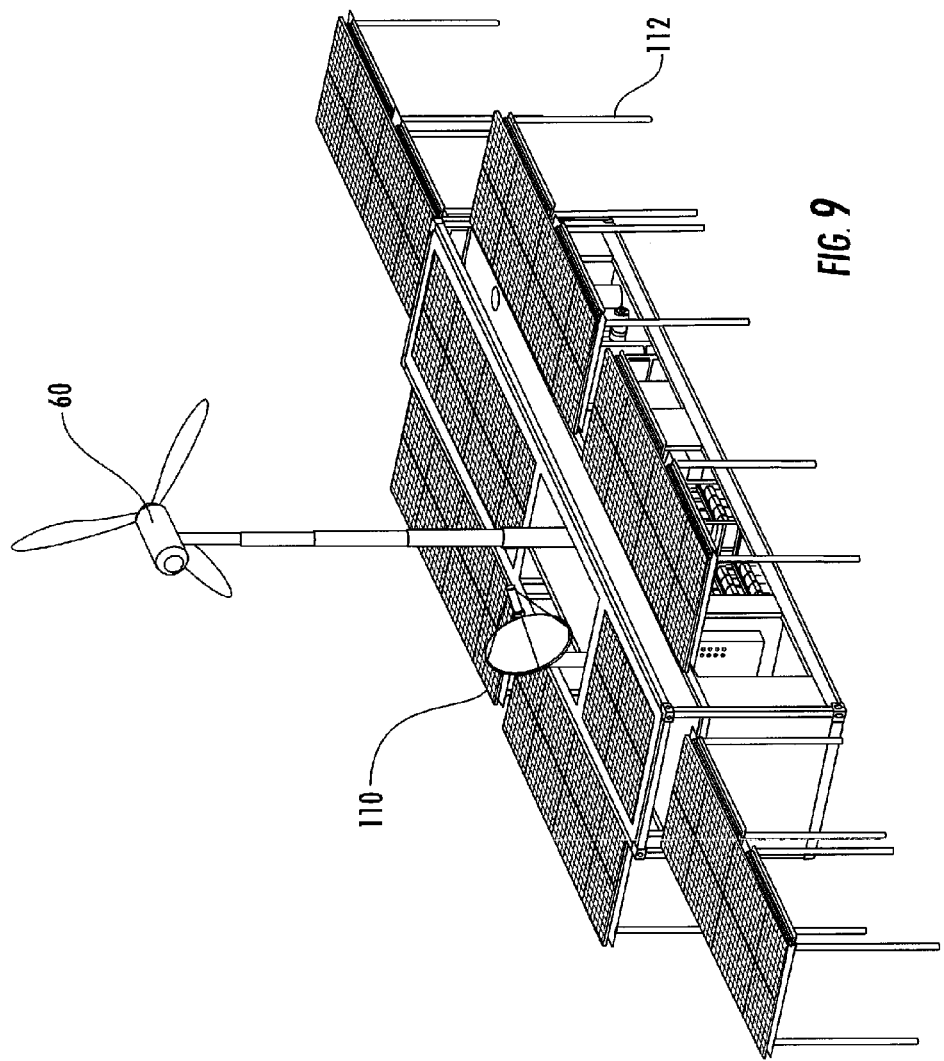
FIG. 9 is an upper perspective view of the portable power station according to another embodiment of the invention including retractable legs for providing additional support to the solar panels.

The interior of the container may include a working area 108 (FIG. 8) and/or living quarters for an operating crew/security detail, which provide the basic needs of the crew for continuous occupation of the station (e.g., bathroom, beds, etc.) The interior may also include communications area containing the telecommunication equipment 92 powered by at least one engine/generator designed to run off the power obtained from the solar panels, wind turbine, electrical storage means and/or at least one generator 84. The telecommunication equipment may include, albeit not limited to, a microwave, satellite, two-way radio/TV, and land line connections. All necessary antennae are removably mounted on the container with jacks or telescoping masts. For example, FIGS. 8 and 9 illustrates a user satellite dish 110 removably attached to the top panel of the container by any means known in the art. The satellite enables utilities like VSAT which offer Wi Fi/VoIP service up to three miles from the unit. The satellite uplink also allows for remote monitoring of the power station. Other communications gear, such as teletype and a facsimile may be included. If the power station is used for disaster response, the communications area would be equipped to provide message service to the public to permit notification of the next-of-kin. This could be a quantity of cell/satellite phones or use of the more sophisticated equipment as a relay.

The water treatment system 76 may be also housed within the container interior and is designed to meet the potable water standards established by the World Health Organization (WHO). According to a preferred, albeit non-limiting example, the water treatment system is powered by at least one engine (Tesla engine) which runs on the energy derived by the solar panels and/or wind turbine. The engine(s) operates the water filtration components, e.g., ozone, ultra filtration, ultraviolet, etc. For example, the station may include a Multiple Stage Filtration (MSF) Process which includes an initial halogen-based chemical treatment for disinfection/deactivation, as described in detail in U.S. patent application Ser. No. 11/264,659 which was previously incorporated by reference. The filtration plant illustrated therein has a capacity to treat approximately 26 gallons per minute (100 LPM) on a batch or continuous flow basis. It should include control systems, sensors which monitor the effluent, and remote monitoring equipment accessible by satellite phone or other means. The water treatment plant automatically bypasses the effluent when unacceptable readings occur. The components in the water filtration unit will be able to process fresh water, remove biological contaminants, heavy metals, and filter water to the micron level. The hollow fiber ultra-filtration unit will remove high molecular weight substances, colloidal material organic and inorganic polymeric molecules.

The resulting potable water is pumped into storage tanks which are connected to the distribution system (not shown). The distribution system terminates in a manifold of valved spigots located on the exterior of the housing structure and easily accessible to the public for drawing potable water. The distribution system has another terminus in the multiple showers located in the container structure in a series of stalls (not shown).

The power station has its own electrical system powered by the energy derived by the solar panels and/or wind turbine and/or at least one motor driven generator 84. The necessary wiring to all the electrical devices on the power station, including lights, radios, water treatment, and electrical receptacles is supplied by a wiring harness connected to the electrical bus. The bus may also have a DC to AC converter and receptacle to plug into a commercial electrical grid, if one is available. The power station may include an electrical distribution system with electrical receptacles located on the exterior of the housing structure and accessible to the public for drawing electricity.

The housing structure would be supplied with a central ventilation system which would include climate control and air sensors for the detection of the air quality and filters for removing air borne contaminants and heat pump for heating and cooling the inside air of the working or living quarters of the container.

Leveling jacks 96 are located at the corners of the container to anchor and level the structure on site. The jacks may be manual or powered. The jacks also serve as lifting points for airlift. Also provided is external lighting on the housing structure for identification and security.

Referring again to FIG. 9, the power station solar panels may include retractable support legs 112 for enhanced stability. In addition, the area under the deployed panels may function like a porch under which seating may be placed to function as a classroom, chapel, or the like. The deployed panels may also have attachment means along the perimeter for removably attaching mosquito netting, VISQUEEN, or other breathable, protective material for enhanced comfort within the station.

Figure 10:
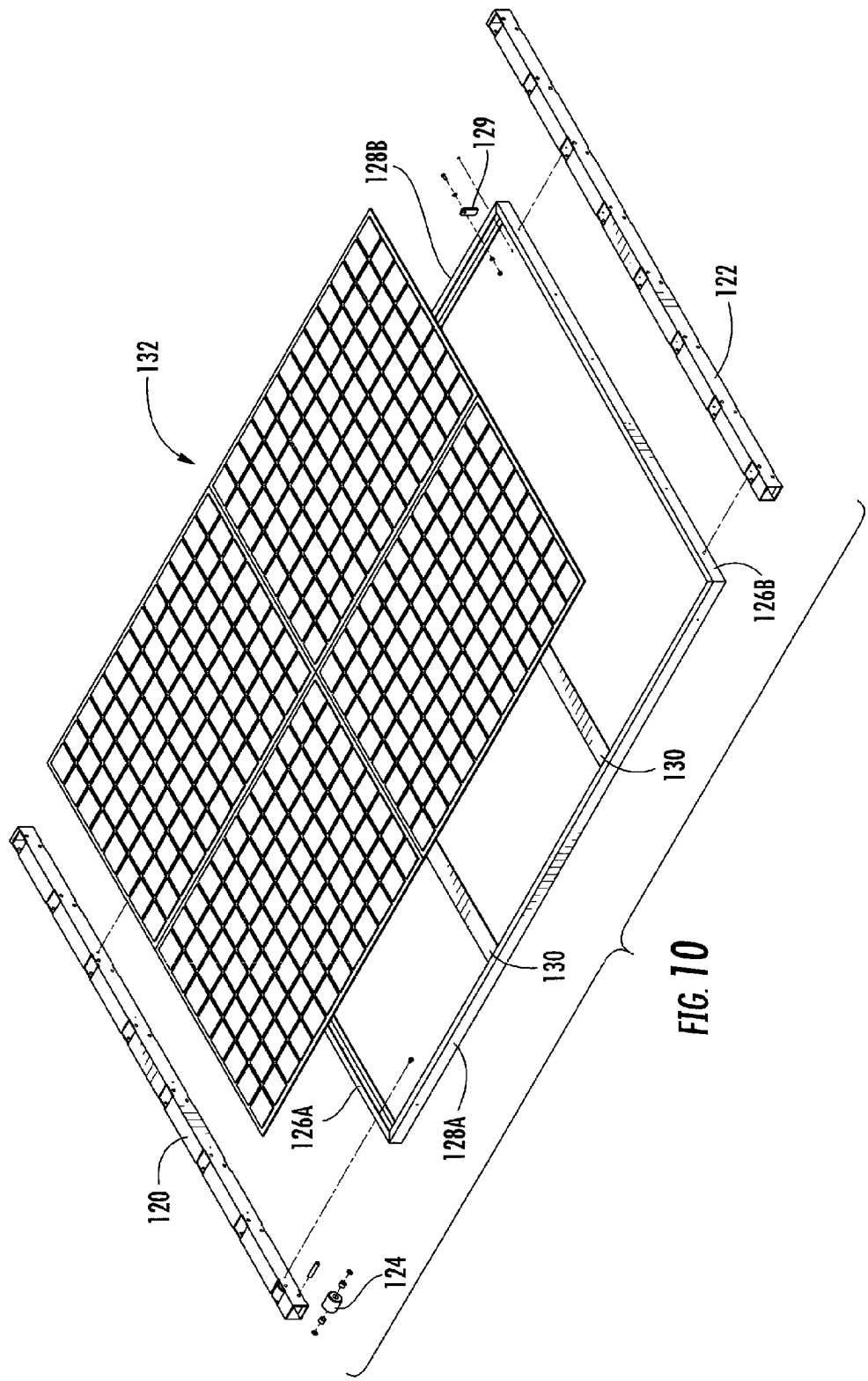
FIG. 10 is an exploded view of a roller assembly that pivotally supports the solar panels and allows the solar panels to be easily moved between a stored to a deployed position.

FIG. 10 is an exploded view of a roller assembly that pivotally supports the solar panels 134 and allows the solar panels 134 to be easily moved between a stored to a deployed position. The roller assembly includes a left roller tube 120 and a right roller tube 122. Each of the roller tubes 120 and 124 include a plurality of rollers 124 mounted along their length. Some of the rollers are mounted such that their roller surface extends above the roller tube while the other rollers are mounted such that their roller surface extends beyond the lower surface of the roller tube. Mounted between the left and right roller tubes 120 and 122 is a solar array frame that includes two side support members 126A and 126B, a front support member 128A and a rear support member 128B. Also positioned within the frame are one or more cross support members 130 that can be oriented either parallel or perpendicular to the side members 126A and 126B dependent upon the orientation of the roller assembly with respect to the container and the geometry of the solar panels 134. The solar array 132 can be formed from one or more individual solar panels 134. Also shown in FIG. 10 is a stop member 129 mounted on the rear support member 128B that prevents the roller assembly from sliding completely out of the container.

Figure 11:
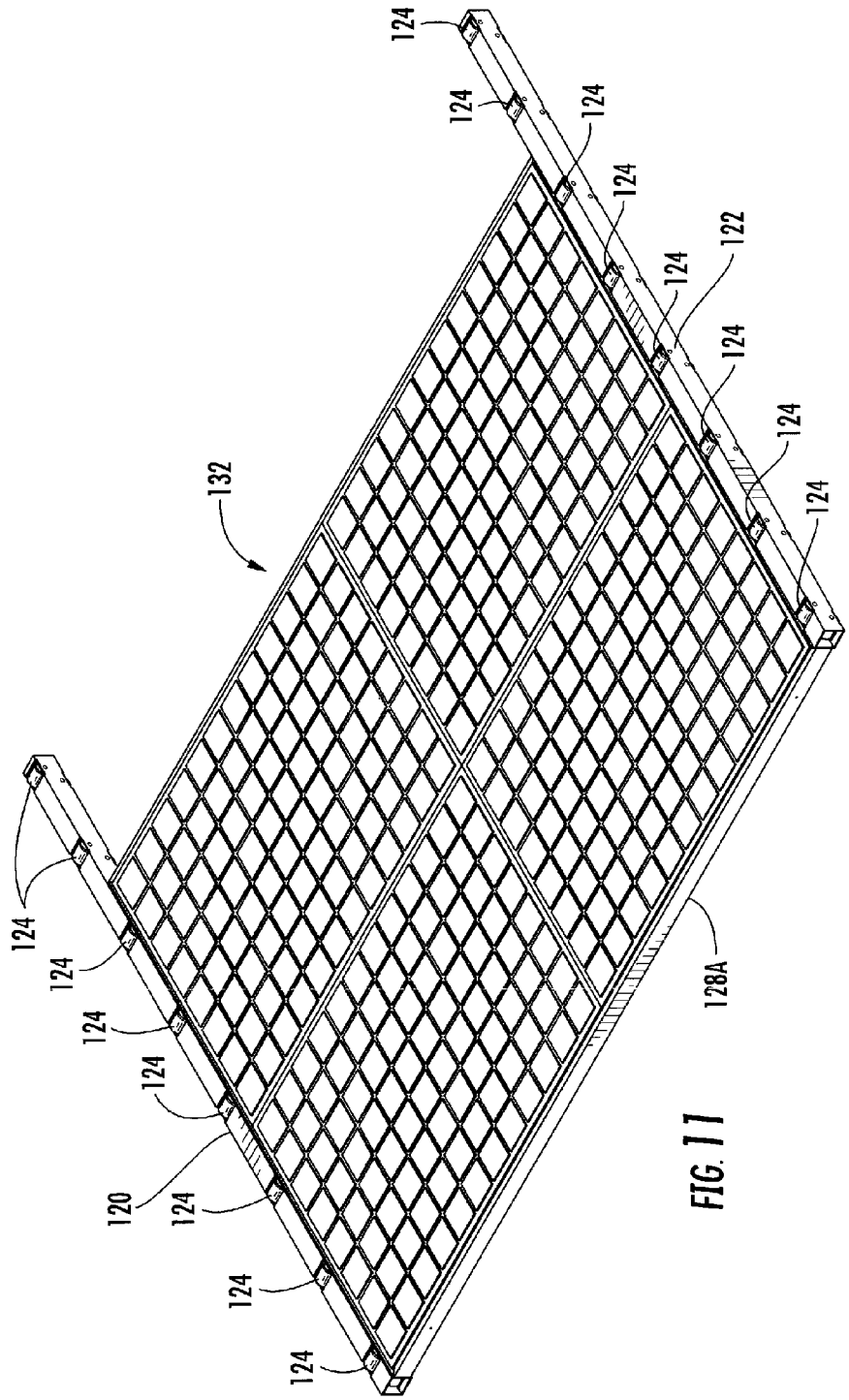
FIG. 11 is a perspective view on one of the solar panel arrays positioned horizontally and mounted within the roller assembly.

FIG. 11 is a perspective view on one of the solar panel arrays 132 positioned horizontally and mounted within the roller assembly. As shown the roller assembly includes a right roller tube 122 and a left roller tube 120. Positioned in roller tubes 120 and 122 are a plurality of rollers 124. In this view only the rollers that extend above the top surface of the roller tubes are visible. It should be understood that similar rollers 124 are positioned proximate each of the ones shown whose surface extend below the surface of the roller tubes. The front support member 128A of the solar array frame is shown positioned between the left and right roller tubes 120 and 122.

Figure 12:
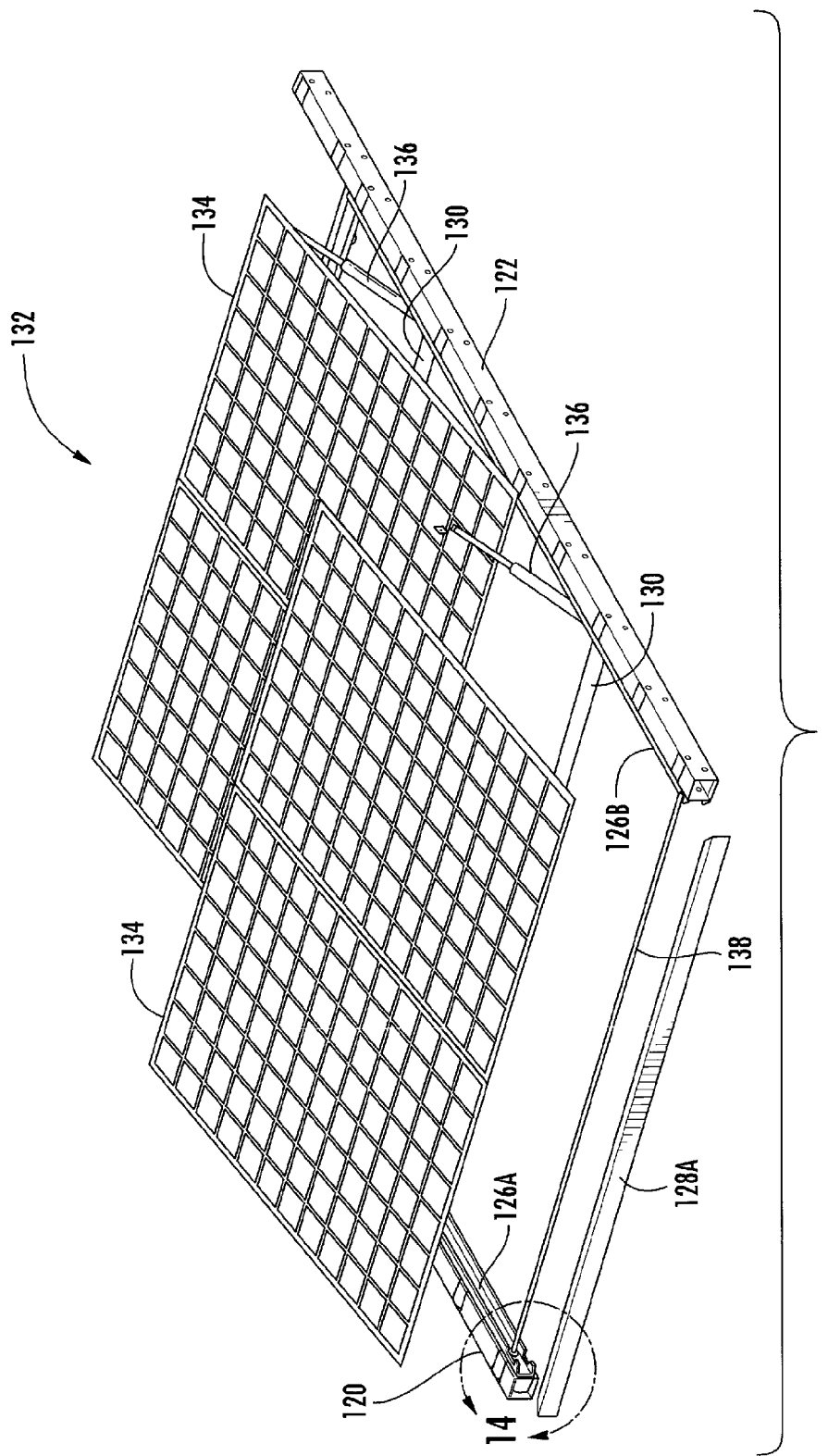
FIG. 12 is a partially exploded perspective view of one solar panel array with the panels in a tilted position.

FIG. 12 is a partially exploded perspective view of one solar panel array 132 made up of two solar panels 134 that are shown in a tilted position. Each solar panel 134 has pair hydraulic actuators 136 that are configured to counter balance the weight of the solar panel and aid in the orientation of the solar panel 134 into a tilted position, as shown. One hydraulic actuator is attached at one end to the right side support member 126B while the opposite end of the hydraulic actuator 136 is attached to a rear portion of solar panel 134. The other actuator of the pair is attached to left side support member 126A with the opposite end of the actuator is attached near a rear portion of the solar panel 134. The forward portion of each solar panel 134 is attached to a ratchet shaft 138. Ratchet shaft 138 is rotatably mounted in side members 126A and 126. A ratchet wheel 142 is fixedly mounted at each end of the ratchet shaft 138. A locking pawl 144 is mounted adjacent each end of the ratchet shaft 138 for pivotal movement to engage and disengage the ratchet wheel 142. The actuators for locking pawls 144 are located on the outboard side of roller tubes 120 and 122. In operation when both locking pawls 144 are pivoted to disengage their respective ratchet wheel 142. The solar panel 134 that is mounted on ratchet shaft 138 will tilt upwards under the influence of hydraulic actuators 136. Once the panel 134 is tilted into the desired position that locking pawls 144 are pivoted back into a locking engagement with ratchet wheels 142 and the solar panel 134. This process is repeated for each solar panel 134 within each solar array 132.

Figure 13:
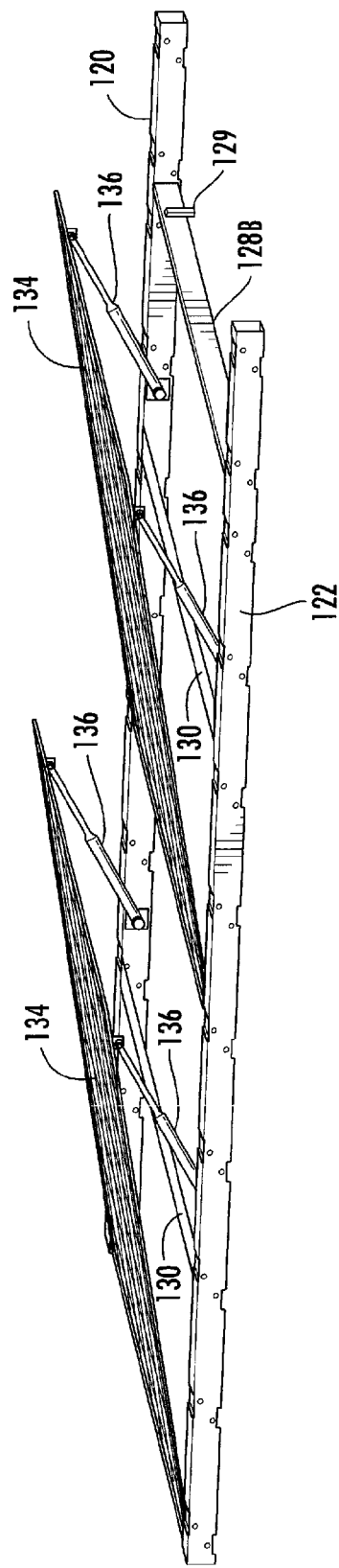
FIG. 13 is a side view of one solar panel array with the solar panels in a tilted position.

FIG. 13 is a side view of one solar panel array with the solar panels 134 in a tilted position. As shown in this figure, a pair of hydraulic actuators 136 is attached to each solar panel 134. The opposite each of each hydraulic actuator 136 is attached to the side support members 126A and 126B. A stop element 129 is attached to rear support member 128B. A pair of cross members 130 connects the two side members 126A and 126B.

Figure 14:
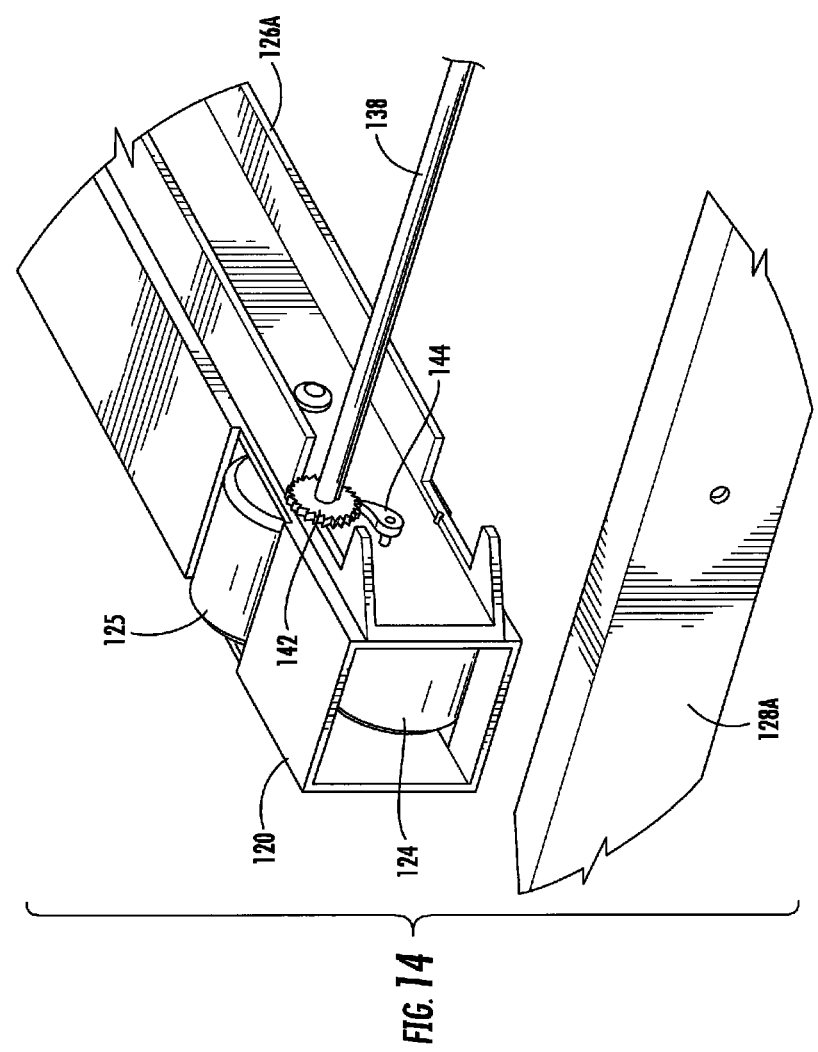
FIG. 14 is an enlarged view of the circled area of FIG. 12 showing the ratchet shaft that supports the solar panels as well as a ratchet wheel and locking pawl to fix the position of the shaft.

FIG. 14 is an enlarged view of the circled area of FIG. 12 showing the ratchet shaft 138 that supports the solar panels 134 as well as a ratchet wheel 142 and locking pawl 144. Also shown in this figure are a pair of rollers 124 that are positioned proximate one another wherein one roller has a rolling surface that extends below the surface of the roller tubes and the other has a rolling surface that extends above the surface of the roller tube.

Figure 15:
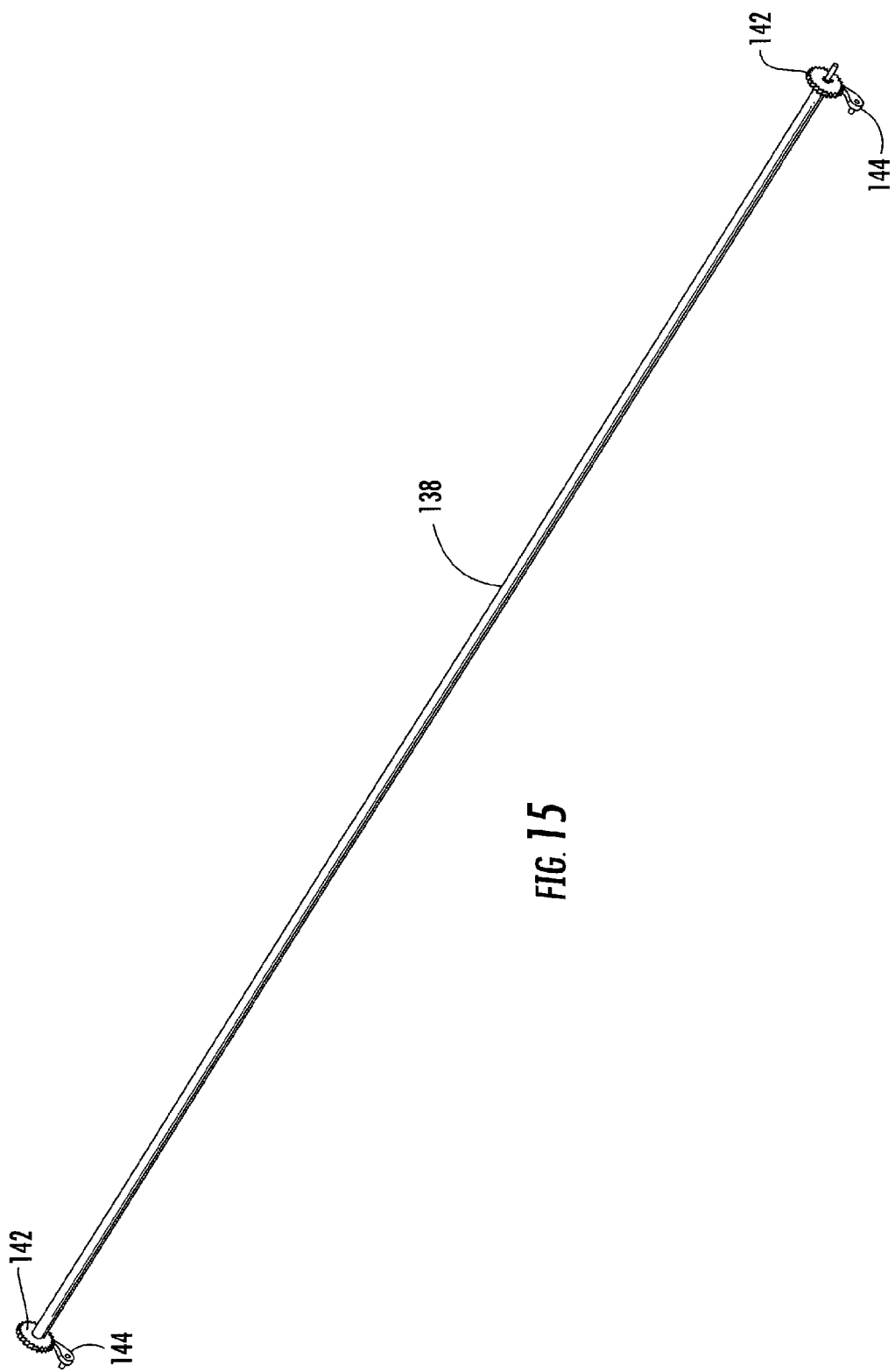
FIG. 15 is a perspective view of the ratchet shaft with a ratchet wheel and locking pawl at each end of the shaft.

FIG. 15 is a perspective view of the ratchet shaft 138 with a ratchet wheel 142 and locking pawl 144 at each end of the shaft 138.

The roller assembly including the roller tubes 120 and 122 each including a plurality of roller 124 provides a simple and easy to operate mechanism for deploying and storing the solar arrays with the container. The hydraulic actuators 136 provide sufficient force to counter balance the weight of the solar panels 134 thereby facilitating easy tilting of the panels within the roller assembly. Likewise the ratchet shaft, ratchet wheels and locking pawls provide a simple and reliable arrangement to lock the position of the solar panels 134.

In operation, the mobile power station would be delivered to a devastated area over land, by air, or over water and set-up near a source of water. The station is supplied with enough provisions for the crew and chemicals for the water treatment module. The primary source of electricity should be obtained via the solar panels and/or wind turbine. This enables the station to remain on site for an extended period of time. The crew of one, two or more personnel would be trained in setting up the station and operating the systems without support or using local help. The crew services the systems on board including deploying the solar panel arrays and wind turbines, replenishing the water treatment chemicals and removing waste products for disposal. In addition, the services of the station would be continuously available to the public according to their needs.

The power station is a natural gathering place for survivors as they come to get water, take a shower, and make necessary calls. The station's communications system links the people with the outside world and keeps them abreast of developments affecting them. For example, a large TV can be mounted on the container. In addition, the communications serve to call for evacuation of medical emergencies.

This includes telecommunication equipment, such as microwave, satellite, two-way radio/TV, teletype, facsimile and land line connections. All the necessary antennae are mounted on the roof of this area. Within the container is the water treatment equipment 76 which is provided with an inlet for the introduction of non-potable water. Doors 66 may be provided on all sides for access to the equipment.

Although not shown in the aforementioned figures, all the electrical connectors, leads, cabling, control systems, transformers, have been provided and need not be discussed further here in the interest of the brevity.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

What is claimed is:

1. A portable, self-sustaining power station comprising:
 a transportable container;
 a stationary solar panel secured to an upper surface of said container and configured to receive sunlight;
 a plurality of movable solar panels stowed beneath said stationary solar panel in individual compartments;
 a mounting assembly including a first and second roller tube each having an upper wall, a lower wall and opposing side walls with a plurality of upper rollers spaced apart and extending at least partially above said upper wall and secured to said side walls by an upper transverse axle member and a plurality of lower rollers spaced apart and extending at least partially below said upper wall and secured to said side walls by a lower transverse axle member constructed and arranged to support each of said movable solar panel and allow movement from the stowed position beneath said stationary solar panel to a deployed position wherein each said movable solar panel is configured to receive sunlight;
 a hydraulic actuator secured to each said movable solar panel and each said side wall constructed and arranged to counter balance the weight of each said solar panel and aid in tilting said movable solar panels for optimum orientation;
 a ratchet shaft rotatably mounted to said side members, said ratchet shaft including a ratchet wheel mounted along each end of said ratchet shaft adjacent to a locking pawl, said locking pawl allowing rotation of said ratchet wheel to allow a tilt angle increase of said movable solar panels;

an actuator for disengaging said locking pawl to allow a tilt angle decrease of said movable solar panels;

an engine driven electrical generator mounted within said container and accompanying said solar panels by a power storage device for storing electrical energy generated from said solar panels and said engine generator;

wherein the power station provides a reliable source of power derived from said power storage device wherein said solar panels are deployed to obtain an optimum panel orientation to allow said solar panels to supply a primary power to the power storage device and said engine driven electrical generator supplies a supplemental power to said power storage device.

2. The portable self-sustaining power station according to claim 1, wherein said upper and said lower transverse axle members comprise an axle spacing;

said axle spacing being less than the diameter of said upper rollers or said lower rollers, whereby said upper rollers at least partially overlap said lower rollers within said first and second roller tubes.

3. The portable, self-sustaining power station according to claim 1, wherein said upper and said lower rollers are substantially annular members with a cylindrical bore along a center of rotational axis;

said cylindrical bore constructed and arranged to cooperate with one of said upper or said lower traverse axle members.

4. The portable, self-sustaining power station according to claim 1, wherein said first and said second roller tubes each comprise roller plates defined as substantially U-shaped channels extending inward in said compartments.

5. The portable, self-sustaining power station of claim 1, wherein said engine is an internal combustion engine, said container further comprising a fuel tank, and a vent to expel fumes from an interior portion of said container to an exterior area.

6. The portable, self-sustaining power station of claim 1, wherein said power storage device is a plurality of rechargeable batteries housed within said transportable container.

7. The portable, self-sustaining power station of claim 1 including a converter placed within said power station for converting direct current (DC) to alternating current (AC).

8. The portable, self-sustaining power station of claim 1 including a telecommunications system capable of transmitting over the group consisting of microwave, satellite, two-way, radio/TV, teletype, facsimile and land line connections.

9. The portable, self-sustaining power station of claim 1 wherein each of said movable solar panels includes at least one retractable support leg positioned perpendicularly to a plane of the movable solar panels when the movable solar panels are in the deployed position to provide stability for the movable solar panels.

10. The portable, self-sustaining power station of claim 1 wherein a plurality of leveling jacks are located about the perimeter of said container to anchor and level the transportable container.

11. The portable, self-sustaining power station of claim 1 wherein said transportable container is a conventional marine shipping container.

* * * * *